United States Patent

Everts et al.

[11] Patent Number: 5,320,150
[45] Date of Patent: Jun. 14, 1994

[54] COLLAPSIBLE STAND

[75] Inventors: Robert G. Everts, Chandler; Harry G. Rickard, Phoenix, both of Ariz.

[73] Assignee: Ryobi America Corp., Easley, S.C.

[21] Appl. No.: 994,884

[22] Filed: Dec. 22, 1992

[51] Int. Cl.$^5$ ............................ A47B 3/00; B23H 1/02
[52] U.S. Cl. .................................. 144/287; 108/179; 144/286 A; 269/901
[58] Field of Search .................. 83/574; 108/90, 113, 108/118, 119; 269/139, 901; 144/286.2, 286 A, 287

[56] References Cited

U.S. PATENT DOCUMENTS

| | | | |
|---|---|---|---|
| 3,692,358 | 9/1972 | Sung | 297/159 |
| 4,073,484 | 2/1978 | Beekenkamp | 144/286 R |
| 4,133,271 | 1/1979 | Carlson | 108/113 |
| 4,278,243 | 7/1981 | Alessio | 269/901 |
| 4,592,287 | 6/1986 | Thygeson | 108/113 |
| 4,757,849 | 7/1988 | Morris | 144/287 |
| 5,105,862 | 4/1992 | Skinner et al. | 144/287 |

Primary Examiner—W. Donald Bray
Attorney, Agent, or Firm—Brooks & Kushman

[57] ABSTRACT

A collapsible stand having a top (14) formed by two mating leaves (15, 17) and supported by legs (28, 30, 32, 34). The legs are pivotedly joined to braces (20, 22, 24, 26) underlying the leaves. The components of the stand pivot with respect to one another so to allow the stand to be easily erected and collapsed. However, due to interaction between at least one of the braces and at least one retainer (64) on the underside of one of the leaves the stand cannot be collapsed without initial planar movement of the leaves away from one another. Since such movement is rare during normal usage, the stand is strong and secure during normal usage. A pair of brackets (80, 82) for holding dimensional lumber (79) may be attached to the braces. When the lumber is placed in the brackets, the stand is further secured in its erect position.

17 Claims, 3 Drawing Sheets

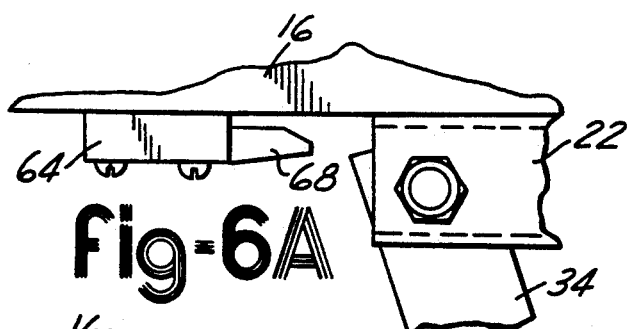
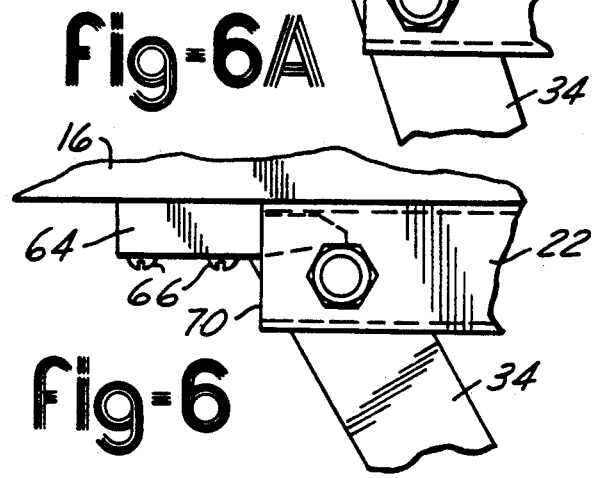
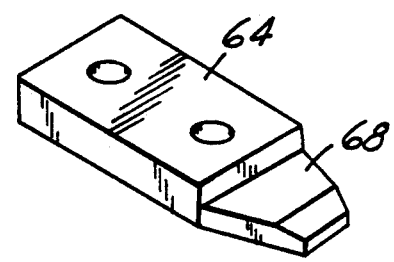
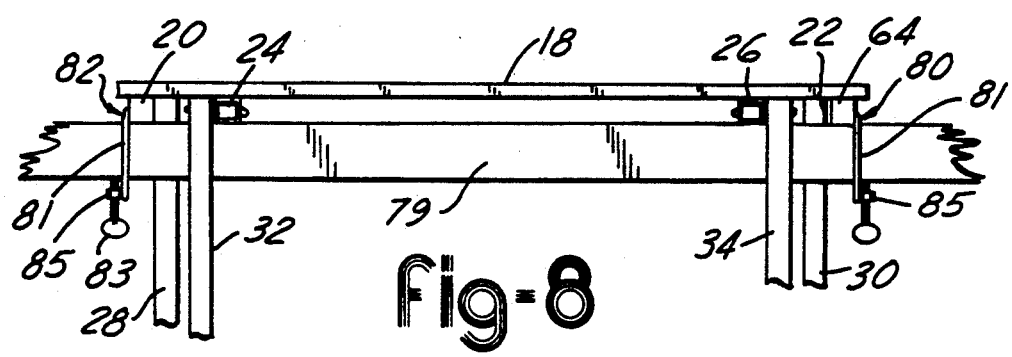
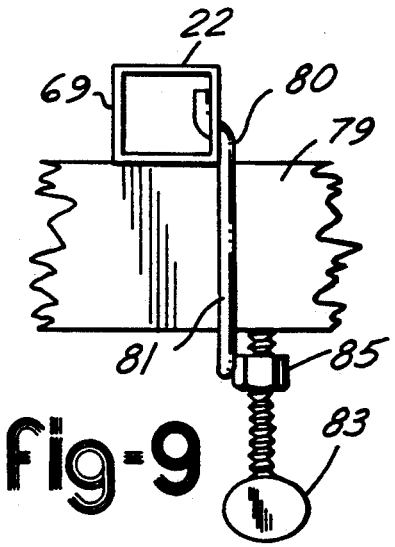
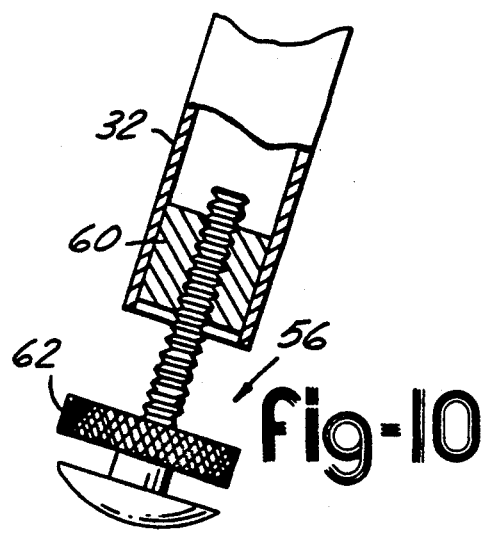

COLLAPSIBLE STAND

TECHNICAL FIELD

This invention relates to stands or tables which can easily be collapsed and erected so that they may be transported from site to site.

BACKGROUND ART

Many individuals have the need to move a table or work stand from one location to another or to store the stand when it is not in use. Thus, stands or tables that can be easily collapsed and erected have been developed. Examples of these types of tables are disclosed in U.S. Pat. No. 3,692,358 issued Sep. 19, 1972 to A. Y. Sung and U.S. Pat. No. 4,592,287 issued Jun. 3, 1986 to L. R. Thygeson.

These stands such as shown in the Sung and Thygeson patents are generally of a type having an erect position in the top planar supporting surface formed by two meeting halves and a folded generally planar position for transportation and storage. The meeting halves are each positioned on pairs of braces which are pivotally connected to corresponding legs. The legs are then pivotally connected to the corresponding leg of the other meeting half. When the legs are opened, the braces are pivoted towards one another until the meeting halves abut to form the top planar supporting surface used as the table top. While such tables do achieve the basic purpose of being easily erected and also easily collapsed to a compact transportation or storage condition, they lack of necessary stability required in certain types of work since the two table members of the table may pivot away from one another with relative ease.

SUMMARY OF THE INVENTION

It is an object of the present invention to provide an easily erectable work stand that is stable and will not accidentally collapse, but may be easily collapsed by the used when so desired.

It is another object of the invention to provide easy means of securing the invention against collapse.

An advantage of the present invention is that the stability of the stand results following a working easy set up procedure that can take less than a second without the need for special tools.

A further advantage of the present invention is that the stand may be secured in its erect position using a pair of brackets and a piece of dimensional lumber.

In carrying out the above objects and features of the present invention, a collapsible stand is disclosed having a stable open position and a closed position during which the stand can be stored or transported. The collapsible stand has a pair of legs, each pair pivotally connected together in their mid-portions for movement between the stand's open position where each pair of legs forms a cross and the stand's closed position where the legs are in generally parallel alignment. Pivotally connected to the upper ends of one of each pair of legs are a pair of leaves movable between a folded position and parallel to and outside the legs when the stand is in its closed position and a coplanar position above the legs when the stand is in its open position. The stand also has restraining means for preventing the leaves pivoting relative to one another when the stand is in its open position except for coplanar movement of the leaves away from one another for predetermined distance, whereafter the leaves may freely pivot.

The restraining means may take the form of a tang joined to one leaf that extends into an open-ended member of the other leaf. This open-ended member may be an elongated brace aligned parallel to the allowed coplanar movement and normal to the line of abutment between the leaves when the stand is in its open position.

Also disclosed is a means for securing the stand in its open position by preventing even the limited inner movement. Such securing means may be provided by having members having substantially even lower surfaces joined to each leaf and rigidly joining to one of the members an attachment which is frictionally held against the other of the members. This attachment may take the form of a piece of dimensional lumber and may also include an extended work support surface providing additional work support surfaces beyond the work support provided by the leaves of the stand.

BRIEF DESCRIPTION OF THE DRAWINGS

FIG. 6 is a side partial view of the stand showing the retaining member inserted in the stand's brace;

FIG. 6A is a side partial view of the stand showing the retaining member no longer within the brace;

FIG. 7 is a perspective view of the retaining member;

FIG. 8 is a partial side view of the stand showing brackets supporting an elongated piece of dimensional lumber;

FIG. 9 is an enlarged side view of the bracket area of the stand; and

FIG. 10 is a partial cut away end view of the leg adjustment region of the stand.

BEST MODE FOR CARRYING OUT THE INVENTION

Figure 1:
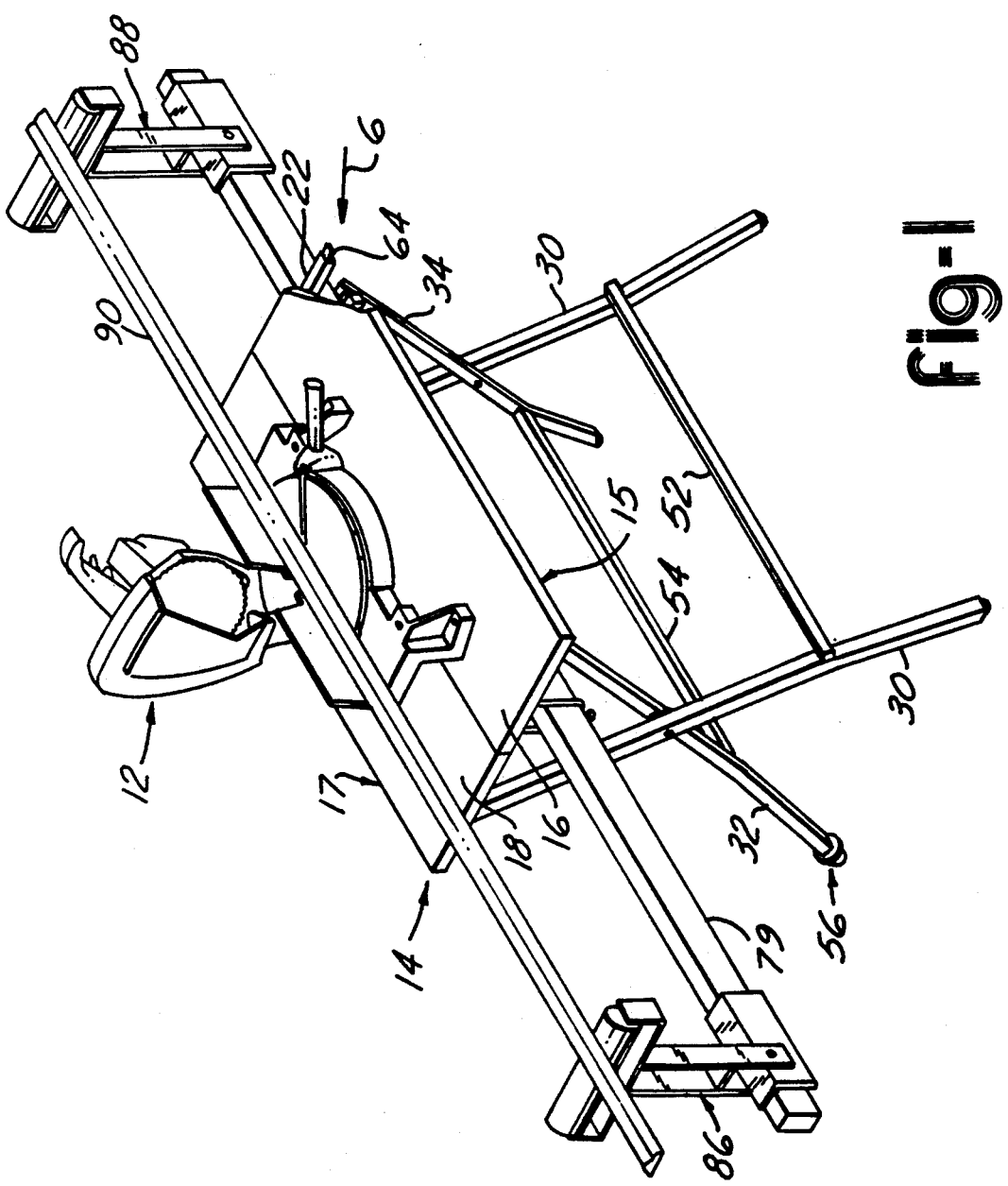
FIG. 1 is a perspective view of an embodiment of the work stand of the invention as it would appear in operation with a miter saw attached to it.

Referring generally to the drawings, there is shown the preferred embodiment of collapsible stand of the invention. FIG. 1 shows the stand 10 in the erect or open position as it might be used at a work site. A miter saw 12 is temporarily and removably attached to the top 14 of the stand which has an essentially planar supporting or work surface. The top 14 is formed by two mating leaves 15 and 17. As further shown in FIGS. 2 and 3, each leaf 15, 17 includes a substantially planar wooden table member 16, 18 and a pair of braces 20, 22 and 24, 26. The table members mate along line of abutment 27 to provide a substantially planar support surface.

Figure 5:
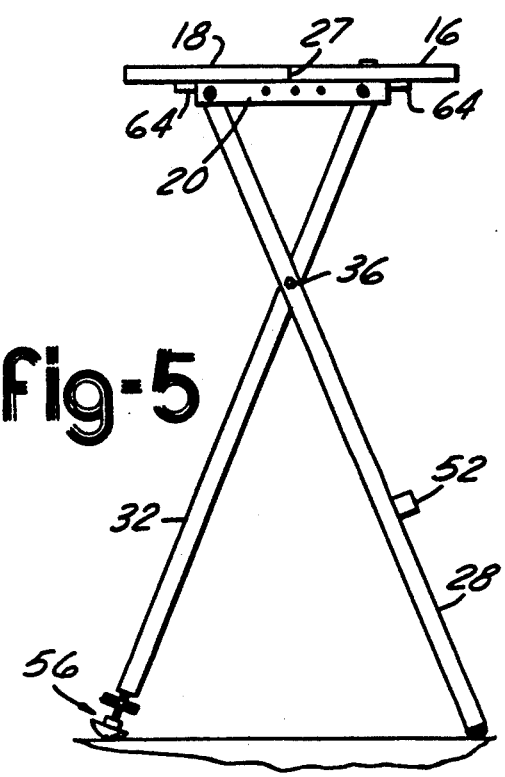
FIG. 5 is a side view of the stand showing it in its final erect or work condition.

Each of the mating table members 16 and 18 are secured to a pair of elongated braces 20, 22 and 24, 26. Braces 20 and 22 are joined to the underside of mating table member 16 in parallel spaced apart positions. Each brace has a free end that extends beyond the underside of mating table member 16 so that when the stand is an erect position as best shown in FIG. 5, the free ends underlie the other mating table member 18. Similarly, the braces 24 and 26 are joined to the under side of mating table member 18 in spaced apart positions. Each brace has a free end which extends beyond the under side of table member 18 so that when the stand is in erect position the free ends underlie mating table member 16.

Braces 24 and 26 are spaced inwardly of brace 20 and 22 for reasons to be discussed later. Each pair of braces extend in a direction opposite to each other and normal to line 27 where the table members 16 and 18 mate.

Figure 2:
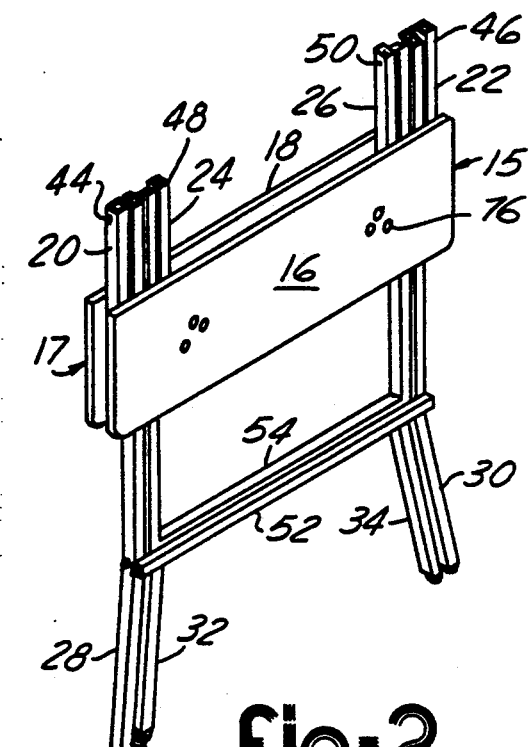
FIG. 2 is a perspective view of the stand in its collapsed condition.
Figure 3:
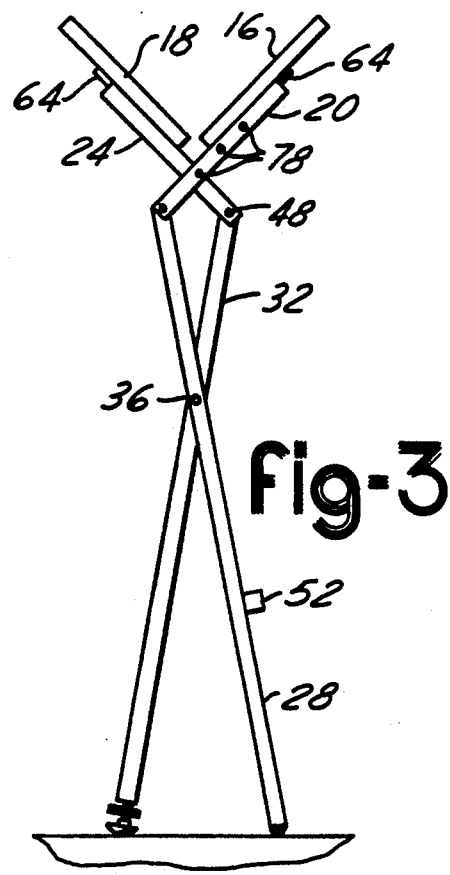
FIG. 3 is a side view showing it in an early stage of being erected or later stage of being collapsed.

Two pair of legs 28, 30 and 32, 34 are pivotally connected by suitable pivot means 36, 38 which in the preferred embodiment take the form of nut and bolt assemblies 40, 42. The top end of each leg is pivotally joined to one of the elongated braces at their free end as shown in FIG. 2. Suitable pivot means 44, 46, 48 and 50 are used which can again take the form of suitable nut and bolt assemblies.

Preferably, opposed legs use longitudinal braces 52, 54 which provide stability and the legs. At least one leg may include height adjusting means 56 including a threaded leg button which can be screwed into a lower leg end 60 to adjust the height of the leg by thumb wheel 62.

As can be seen in FIGS. 2–5, the spaces between braces 20, 22, 24 and 26 and legs 28, 30, 32 and 34 is such that these elements can move about their respective pivots with respect to each other. The braces and legs are preferably made of steel. The table members are preferably made of ¾ inch thick plywood. In the preferred embodiment, the elongated braces 20, 22, 24 and 26 consist of square hollow open ended bars.

Positioned on the underside of at least one of the mating table members is a retainer 64 held in place by screws 66 or other suitable means. Retainer 66 has a tang 68 slightly spaced from the underside of the stand top 14. The retainer is made of a suitable hard material, preferably a plastic such as ABS. The tang is beveled so to allow it to easily moved within the open free end 70 of one of the elongated braces when the stand is in its erect position as shown in FIGS. 5 and 6. The tang slidingly holds the elongated brace in a position next to the mating table member and allows the brace to initially move only parallel to the planar surface of the table member in a direction away from the tang and normal to the abutment line 27 until after the tang is cleared. At least one retainer should be used, but preferably a second retainer is positioned on the other mating table member.

Figure 4:
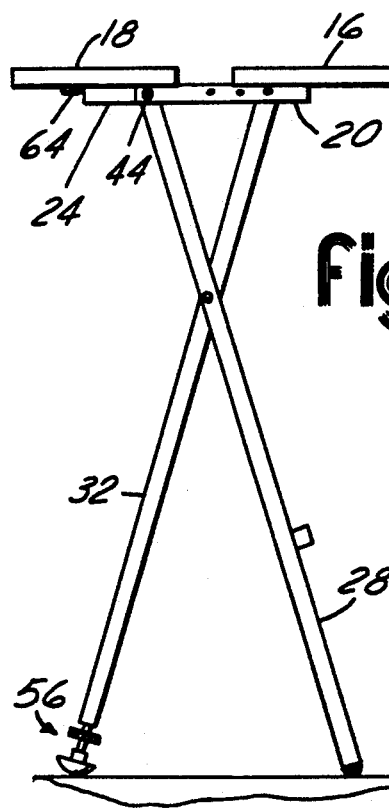
FIG. 4 is a side view of the stand showing it in an erect open position.

Because of the relationship between the tang and its corresponding brace, when the stand is in its erect position the abutting table members cannot be moved relative to one another except for limited coplanar movement away from one another until the tang is cleared by the brace as shown in FIGS. 4 and 5.

Referring back to FIG. 5, the stand is shown in its fully erect open position. Due to abutment between the mating surfaces and placement of the tang of the retainer within its corresponding brace, the two table members 16, 18 will remain mated during jarring of the stand from any direction. The table members can only be separated by a coplanar force parallel to the planar surface of the table members and normal to the line of abutment between the table members. Since such a force is unlikely to occur except by design, the work surface will remain stable and together in all expected work conditions.

To collapse the stand, the table members 16 and 18 are grasped and pulled away from each other while they remain in the same plane until such time as the braces clear the tangs of the retaining members such as shown in FIG. 4. During this movement, due to the pivotal relationship between the legs and the braces, the bottom of the legs will be moved towards one another as shown in the movement between FIGS. 5 and 4. The table members are then pulled upwardly and outwardly to a position shown in FIG. 3, with legs 28, 30, 32 and 34 pivoting about pivot points 36, 38. The pivoting is continued until the distance between the upper pivot points 44, 48 is less than the length of the free ends of the braces between their pivot with the legs and the table member to which they are attached. The table members are then pivoted downward until the braces and legs are generally parallel to one another in a closed or folded position as shown in FIG. 2. To erect the stand, movements are undertaken in reverse order. Thus, it can be seen how the stand can be quickly and easily moved back and forth between its fully erect work position and its fully collapsed position.

The stand may be of any convenient size and thus can be used as a seat, table top, etc. However, in the preferred embodiment, the stand is intended to be a work station for which it is particularly suited due to its strength and stability.

For use as a work station, holes 76 may be placed in the table members by which equipment may be attached such as miter saw 12 as shown in FIG. 1.

In the preferred embodiment, holes 78 are made in the sides of elongated braces 20, 22 allow brackets 80, 82 to be inserted in the braces so to depend therefrom. The brackets are of such a shape to support an elongated piece of dimensional lumber 79, such as a 2×4. Preferably, each bracket has a substantially U-shaped portion 81 made of ¼-inch diameter steel. The ends of each bracket is offset in an S-shape manner by an amount corresponding to the thickness of the brace to allow the bracket to hang properly when it is inserted into the brace. Each bracket preferably includes a thumb screw 83 rotatable within a nut 85 joined to the lower end of the U-shaped portion of the bracket.

After the lumber is placed in the brackets, the lumber is pushed against the lower surface of the braces by the tightening of thumb screws 83. On the ends of the elongated lumber 79 roller assemblies 86 and 88 are positioned. These are adjustable so that the top of the roller assemblies correspond with the top of the attached machine's work surface. This allows long pieces of wood 90 to be supported by the stand and cooperating roller assemblies. This arrangement provides a convenient and efficient work station and can be easily disassembled and stored in a minimum amount of space, making it particularly suitable for on-site usage.

The use of brackets 80,82 and thumb screws 83 provide a method of securing the stand in its open position so that no movement of the leaves can occur. When the thumb screws are tightened, the lumber is pushed tightly against the lower side of the braces. The resultant friction between the wood and the braces prevent the coplanar movement necessary to clear the tangs and thus secures the stand in its erect position. In fact, since the tightly attached piece of lumber also prevents pivotal movement between the leaves, a stable stand is created without the need for the tangs. The tangs, however, are still preferred since they provide suitable stability of the stand during the placement and tightening of the wood in place.

While the best mode for carrying out the invention has been described in detail, those familiar with the art to which this invention relates will recognize various alternative designs and embodiments for practicing the invention as defined by the following claims.

What is claimed is:

1. A collapsible stand having a stable open position and a closed position for storage and transportation, said stand comprising:
   two pairs of legs, each pair pivotally connected together in their mid-portions for movement between the open position of the stand where legs form a cross and the closed position where the legs are in generally parallel alignment;
   a pair of leaves, each pivotally connected to the upper ends of one of each pair of legs and movable between a folded position parallel to and outside the legs when the stand is in its closed position and a coplanar position above the legs when the stand is in the open position; and
   restraining means for preventing the leaves from moving relative to one another when the stand is in the open position except for coplanar movement of the leaves away from one another for a predetermined distance whereafter the leaves may freely pivot.

2. The collapsible stand of claim 1 wherein a first one of said leaves includes a member having a portion extending in the direction of the unrestrained movement and such portion underlying a portion of the second leaf when the stand is open; and said retaining means including a device joined to said second leaf which slidingly holds said portion of said member.

3. The collapsible stand of claim 2 wherein the member portion is open-ended and the device is a tang.

4. The collapsible stand of claim 3 wherein the leaves abut each other when the stand is in the open position along a line, said open-ended member is an elongated brace aligned parallel to the allowed coplanar movement and normal to the line of abutment.

5. The collapsible stand of claim 2 further comprising means for securing the stand in its open position by preventing said limited planar movement.

6. The collapsible stand of claim 2 wherein said second leaf includes a member having a lower surface substantially even with a lower surface of the first leaf member and said securing means comprising an extended attachment and means for rigidly joining the extending attachment to the first one of said members and for frictionally holding the extended attachment against the second of said members.

7. The collapsible stand of claim 6 wherein said extended attachment is a piece of dimensional lumber.

8. The collapsible stand of claim 6 wherein said joining and holding means comprise a bracket for receiving the piece of dimensional lumber and a clamp joined to the bracket for urging the piece of dimensional lumber toward said members.

9. The collapsible stand of claim 7 wherein said leaves when the stand is in the open position provide for a work support surface and the extended attachment includes an extended work support for providing an additional work support surface beyond the support provided by the leaves.

10. A collapsible stand having a stable open position and a closed position for storage, transportation, or the like, comprising:
    two pairs of legs, each pair of pivotally connected together in their mid-portions for movement between the open position of the stand where each pair of legs form a cross and the closed position where the legs are in generally parallel alignment;
    a pair of leaves, each pivotally connected to the upper ends of one of each pair of legs and movable between a folded position parallel to and outside the legs when the stand is in its closed position and a coplanar position above the legs when the stand is in the open position; and
    securing means for preventing movement of the leaves relative to one another upon placement of a securing member within the securing means.

11. The collapsible stand of claim 10 wherein the securing member is an elongated member and the securing means rigidly but removably join the elongated member to one of said leaves so that it frictionally engages the other of said leaves when the stand is in the open position so to prevent relative movement between the leaves.

12. The collapsible stand of claim 11 wherein said securing means includes a pair of brackets depending from the underside of the leaf through which the elongated member may be placed when the stand is in its open position and tightening means on said brackets for moving the positioned elongated member upward against the lower surface of said second leaf.

13. The collapsible stand of claim 10 wherein said leaves when the stand is in the open position provide for a work support surface and the extended member includes an extended work support for providing an additional work support surface beyond the support provided by the leaves.

14. The collapsible stand of claim 10 wherein a portion of the first of said leaves underlies the second of said leaves and said securing means comprises a substantially vertical hole in said second leaf and a hole in the underlying portions of said first leaf which are aligned when the stand is in its open position and the securing member comprises a pin positioned in said aligned holes.

15. A collapsible stand having a stable open position and a closed position for storage, transportation, or the like, comprising:
    two pairs of legs, each pair pivotally connected together in their mid-portions for movement between an open position of the stand where each pair of legs form a cross and the closed position where the legs are in generally parallel alignment;
    a pair of leaves;
    each leaf comprising a table member and a pair of parallel spaced apart elongated braces partially underlying and joined to the table member and each brace having a free portion extending under the table member of the other leaf parallel to the other leaf's braces when the stand is in the open position;
    each leaf pivotally connected by the free portions of the braces to the upper end of one of each pair of legs and movable between a folded position parallel to and outside the legs when the stand is in its closed position and a coplanar position above the legs with the table members in abutment along a line so as to provide a work surface when the stand is in its open position; and restraining means joined to the underside of the first of said leaves for slidingly holding the free portion of one of the braces of the second leaf when the stand is in the open position so as to prevent the leaves from moving relative to one another except for coplanar movement of the leaves away from one another in a direction normal to the line of abutment for a predetermined distance, whereafter said brace is no longer slidingly held within the retaining means and the leaves may freely pivot.

16. The collapsible stand of claim 15 wherein the stand further comprises securing means for receiving a dimensional piece of lumber, said securing means comprises a pair of brackets which depend from two of the braces, the brackets having an opening therethrough suitable for placement of said lumber and further comprising a clamp upward against the brace.

17. The collapsible stand of claim 15 wherein the stand wherein said one brace of the second leaf is open-ended and the restraining means comprises a tang which slidingly holds said one brace by entry into said open end.

* * * * *